May 31, 1932.     W. O. HEBLER     1,860,541
GAS ANALYSIS APPARATUS
Filed Nov. 8, 1929

INVENTOR
William O. Hebler
BY
Frank C. Fischer
ATTORNEY

Patented May 31, 1932

1,860,541

UNITED STATES PATENT OFFICE

WILLIAM O. HEBLER, OF NEWARK, NEW JERSEY, ASSIGNOR TO CHARLES ENGELHARD, INC., OF NEWARK, NEW JERSEY, A CORPORATION OF NEW JERSEY

GAS ANALYSIS APPARATUS

Application filed November 8, 1929. Serial No. 405,586.

This invention relates to apparatus for analyzing gases, liquids and solids carried in liquids, and more particularly to thermal conductivity units for use in such apparatus.

Heretofore, in analysis apparatus, such as described in Bureau of Standards Technologic Paper No. 249, and in the patent to Shakespear, No. 1,304,208, of May 20, 1919, in which the thermal-conductivity method is employed, two or more measuring resistances are placed in various arms of a Wheatstone bridge, one of them being known as the standard unit, and the other as the analysis unit.

In such apparatus it is of vital importance that the current through the bridge circuit be maintained absolutely uniform; and the only practical solution is the use of storage batteries.

In arrangements such as described in the Bureau of Standards paper and the Shakespear patent, the heating element performs two functions; that is, it serves as a heating element and as a means for balancing or unbalancing the Wheatstone bridge, the balancing effects depending upon the thermal conductivity of the gas being tested as compared with the thermal conductivity of a standard gas.

It is an object of this invention to provide a single thermal conductivity unit which serves the purposes of the standard unit and the test unit as are commonly used and employed in analysis apparatus.

A further object is the provision of a thermal conductivity unit which simplifies the manipulation of analysis apparatus, and materially reduces the cost thereof.

These and other objects are attained by the novel construction, combination and arrangement of parts hereinafter described and shown in the accompanying drawings constituting a material part of this disclosure and in which.

Figure 1:
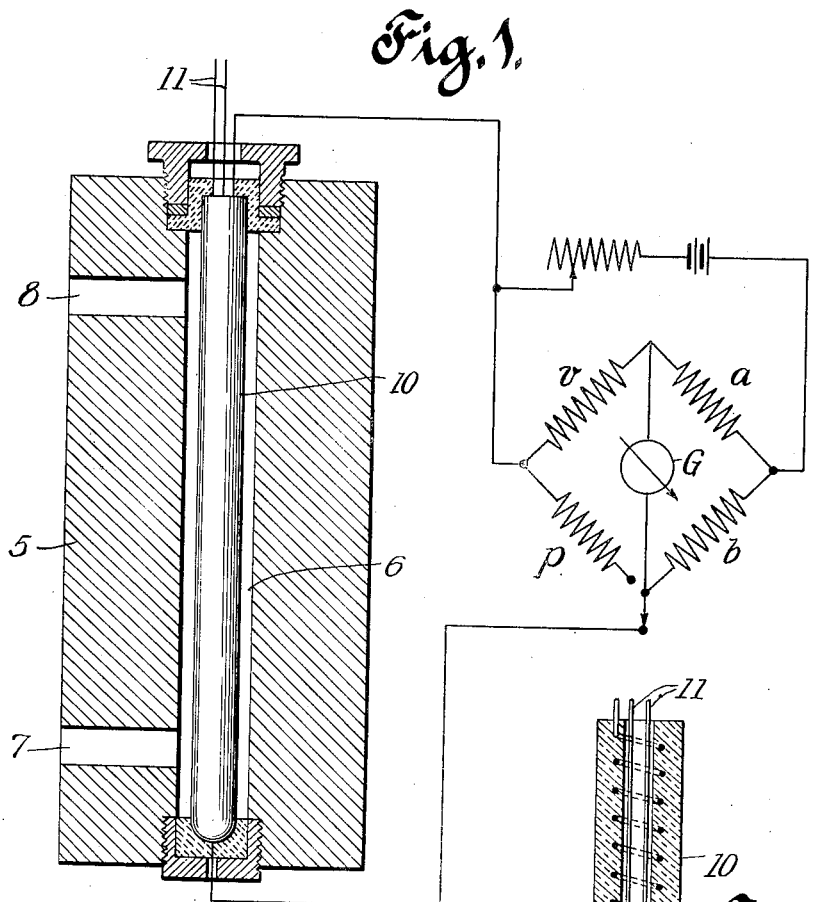
Figure 1 represents a sectional view of an analysis cell having a resistance element connected in a Wheatstone bridge circuit.

Referring to the drawings, the thermal conductivity unit is shown to include a cell 5, preferably made of copper, or of a similar material having high thermal conductivity.

Figure 2:
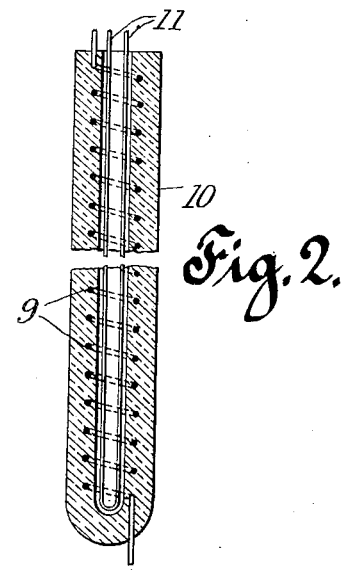
Figure 2 represents a sectional view of a unit carrying resistance and heating elements.

The cell 5 has a central chamber 6, into which opens an inlet passage 7 near the bottom of the cell, and an outlet passage 8 near the top. Positioned in the chamber 6 is a resistance element, which preferably comprises a fine platinum wire 9, embedded in the walls of a quartz tube 10. (See Fig. 2.) Carried in the tube is a heating element 11, preferably of nichrome wire or the like, which may be connected to a source of alternating current or any other source of electric current.

As will be seen in Figure 1, the resistance element forms one branch of a Wheatstone bridge, the remaining branches $a$, $b$ and $v$, being formed of manganin coils of fixed resistance, mounted together with the usual switch, battery and rheostat. Coils $a$ and $b$ usually have a resistance of 100 ohms each, and coil $v$ has a resistance equal to the normal resistance of the platinum wire resistance element 9 plus the line resistance.

In operation, the heating element 11 is heated to temperature above room temperature, and dissipates heat through the resistance element 9, which heat is conducted to the walls of the cell 5 by the gas which is in the chamber 6.

Inasmuch as air is used as the standard gas, the galvanometer G is calibrated accordingly. Now, when a gas such as hydrogen is passed through chamber 6, the heat from the heating element 11 will be conducted to the walls of the cell 5 at a rate seven times greater than it was when air was used, for hydrogen has a thermal conductivity seven times greater than air.

Consequently, the resistance element 9 will be rapidly cooled, causing a decrease in the value of its resistance and an unbalanced condition in the Wheatstone bridge, which will be indicated on the galvanometer G. Should the gas being tested be not pure hydrogen, the deflection of the galvanometer will indicate the percentage of hydrogen present.

In order to indicate whether the current flowing through the resistance element 9 is sufficient, there is provided in connection with the Wheatstone bridge a coil P having a resistance equal to the line resistance plus the resistance of the resistant element 9 at a predetermined position of the indicating pointer of the galvanometer, which predetermined position may be indicated by a red mark on the galvanometer scale.

When the coil P is substituted in the Wheatstone bridge for the resistance element 9, the pointer should deflect to the red mark on the scale. Should the pointer deflect above or below this mark the current is adjusted by means of the rheostat R to its proper value.

Although the invention has been described above in the analysis of gases, it may be equally as well applied for analyzing gases in liquids, solids in liquids, liquids in liquids, without materially modifying the structure described and shown.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. In a gas analysis apparatus, a metal block having a single chamber, a quartz tube mounted in the chamber, a heating element carried in the tube, and a resistance element embedded in the walls of the quartz tube.

2. In a gas analysis apparatus, a metal block having a single chamber, a quartz tube rigidly mounted in the chamber, a heating element carried in the tube and adapted to be connected to an external source of electrical current, and a resistance element embedded in the walls of the quartz tube and surrounding said heating element.

3. In a gas analysis apparatus, a quartz tube, a heating element carried in the tube, and a resistance element embedded in the walls of the quartz tube.

4. In a gas analysis apparatus of the thermal conductivity type, a metal block having a chamber with inlet and outlet passages, a Wheatstone bridge circuit, a coiled resistance element mounted in the chamber and forming a branch of the Wheatstone bridge, and a heating element mounted in the chamber and passing through the coils of and extending the length of the resistance element.

This specification signed this first day of November, 1929.

WILLIAM O. HEBLER.